(12) United States Patent
Kawamoto

(10) Patent No.: US 10,224,713 B2
(45) Date of Patent: Mar. 5, 2019

(54) LOAD DRIVING DEVICE

(71) Applicant: DENSO CORPORATION, Kariya, Aichi-pref. (JP)

(72) Inventor: Ippei Kawamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 15/439,050

(22) Filed: Feb. 22, 2017

(65) Prior Publication Data
US 2017/0244246 A1 Aug. 24, 2017

(30) Foreign Application Priority Data
Feb. 24, 2016 (JP) .................... 2016-33520

(51) Int. Cl.
H01H 35/00 (2006.01)
H01H 83/00 (2006.01)
H02H 3/00 (2006.01)
H01H 47/00 (2006.01)
H02J 1/00 (2006.01)
B60L 11/18 (2006.01)
H02J 7/00 (2006.01)

(52) U.S. Cl.
CPC ............ *H02J 1/00* (2013.01); *B60L 11/18* (2013.01); *H02J 7/0029* (2013.01); *H02J 2007/0039* (2013.01)

(58) Field of Classification Search
CPC .... H02J 1/00; H02J 7/0029; H02J 2007/0039; H02J 9/069; B60L 11/18
USPC ......................................................... 307/131
See application file for complete search history.

(56) References Cited

U.S. PATENT DOCUMENTS

| | | |
|---|---|---|
| 2003/0007375 A1 | 1/2003 | Boscolo et al. |
| 2005/0286200 A1 | 12/2005 | Ohshima |
| 2010/0176764 A1 | 7/2010 | Tachikawa et al. |
| 2011/0242716 A1* | 10/2011 | Ueta ............... H02H 3/087 361/79 |
| 2012/0275070 A1 | 11/2012 | Sicard |
| 2013/0063850 A1 | 3/2013 | Kawamoto et al. |
| 2014/0078629 A1 | 3/2014 | Cortigiani et al. |

FOREIGN PATENT DOCUMENTS

| | | |
|---|---|---|
| JP | 2001-008363 A | 1/2001 |
| JP | 2009-071370 A | 4/2009 |

* cited by examiner

*Primary Examiner* — Carlos D Amaya
(74) *Attorney, Agent, or Firm* — Posz Law Group, PLC

(57) ABSTRACT

A load driving device includes a switching element, a detector, a determination portion, a controller, and a threshold set portion. The switching element is arranged between a voltage source and a load, or between the load and a ground. The switching element is turned on to supply electric power from the voltage source to the load. The detector detects a current flowing in the switching element. The determination portion compares a detection value of the detector and a threshold value, and determines whether an overcurrent flows in the switching element. The controller controls the switching element based on a determination result of the determination portion. The threshold set portion sets the threshold value to a higher value as voltage of the voltage source is higher. As such, responsiveness of the load driving device is improved and the switching element is protected when a short-circuiting occurs.

12 Claims, 6 Drawing Sheets

LOAD DRIVING DEVICE

CROSS REFERENCE TO RELATED APPLICATION

This application is based on Japanese Patent Application No. 2016-33520 filed on Feb. 24, 2016, the disclosure of which is incorporated herein by reference.

TECHNICAL FIELD

The present disclosure relates to a load driving device having a protection function.

BACKGROUND

JP 2001-8363 A discloses a load driving device (i.e., a lamp lighting device) including a switching element (i.e., MOSFET), a timer and a controller. The switching element has a function of self-cutoff at an excess temperature and is turned on to provide electric power from a voltage source (i.e., a battery) to a load (i.e., a lamp). The timer operates from a time point at which an energization to the switching element is started. During an operation period of the timer, the controller conducts the switching element again when the temperature of the switching element increases to a constant value and the switching element is cutoff.

SUMMARY

A resistance of a filament of the lamp is low at a normal temperature right before the lamp is lit and the resistance of the filament of the lamp is high at a high temperature during the lighting of the lamp. Therefore, a rush current flows right after the lighting of the lamp. In JP 2001-8363 A, the controller detects the self-cutoff of the switching element caused by the rush current and operates the switching element again. As a result, in JP 2001-8363 A, a delay of the lighting of the lamp is restricted, that is, responsiveness is improved.

However, when the switching element is short-circuited to the ground or the voltage source and a short-circuit current flows into the switching element as an overcurrent, the switching element is operated again after the cutoff. Therefore, a wire harness connecting the switching element, the load driving device, the load and the voltage source is not safely protected when the short-circuiting occurs.

It is an object of the present disclosure to provide a load driving device capable of increasing responsiveness and safely protecting a switching element when a short-circuiting occurs.

According to an aspect of the present disclosure, a load driving device includes a switching element, a detector, a determination portion, a controller, and a threshold set portion. The switching element is arranged between a voltage source and a load, or between the load and the ground. The switching element is turned on to supply electric power from the voltage source to the load. The detector detects a current flowing in the switching element. The determination portion compares a detection value detected by the detector with a threshold value, and determines whether an overcurrent flows in the switching element. The controller controls the switching element based on a determination result of the determination portion. The threshold set portion sets the threshold value to a higher value as a voltage of the voltage source is higher.

When a connection state of the voltage source and the load driving device, a connection state of the load and the load driving device or a degree of degradation of the voltage source is the same, the voltage of the voltage source is lower in a short-circuit state, in which the switching element is short-circuited to the voltage source or the ground, than in a rush state, in which the rush current flows. That is, the threshold value is set to a higher value in the rush state, and the threshold value is set to a value lower than the rush state in the short-circuit state.

The rush current is lower than the threshold value set in the rush state and is not determined as the overcurrent. As a result, the responsiveness of the load driving device is improved. The short-circuit current is equal to or higher than the threshold value set in the short-circuit state and is determined as the overcurrent. Since the threshold value set in the short-circuit state is low, an energy of a back electromotive force is also low. As a result, the switching element is safely protected in the short-circuit state.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
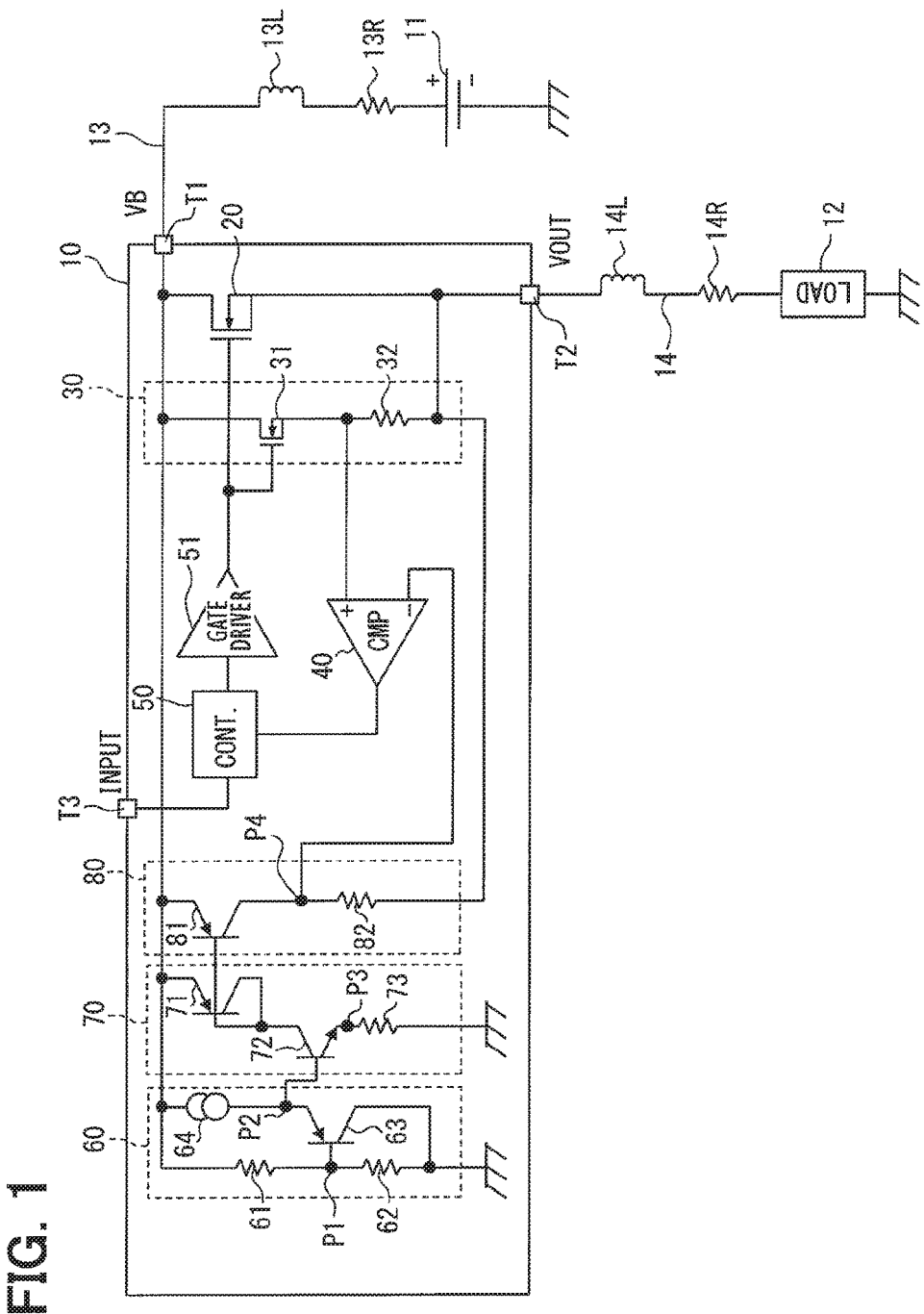
FIG. 1 is a diagram illustrating a schematic structure of a load driving device according to a first embodiment.

According to the inventor's examination, the following issues are found.

It is known to protect elements such as a switching element when a short-circuiting occurs by detecting a current flowing in the switching element and comparing with an overcurrent threshold. However, in the load having a large rush current such as a lamp, a rush current is not distinguishable from a short-circuit current. In the case where the switching element is turned off to interrupt the current when the detection value of the current is higher than the threshold, the rush current is also interrupted. As a result, the lighting of the lamp is delayed.

It is known to set the overcurrent threshold to a value sufficiently lower than the rush current and to clamp the current at the value in order to protect the switching element from an energy stored in the wire harness when the switching element is turned off.

For example, a temperature of a semiconductor chip in which the switching element is arranged and a temperature of a semiconductor chip in which at least a part of elements of the load driving device other than the switching element is arranged are detected. An overheat state of the switching element is detected from a temperature difference $\Delta T$ of the semiconductor chips and on and off of the switching element is controlled. Specifically, the switching element is turned off when the $\Delta T$ increases to an interrupt temperature, and the switching element is turned on again when the $\Delta T$ decreases to a resurgence temperature. Accordingly, the lamp is heated and lit by turning on and off the switching element so as not to excessively heat the switching element.

When the switching element and the other elements of the load driving device are arranged in the same semiconductor chip, a temperature at a position of the semiconductor chip close to the switching element and a temperature at a position of the semiconductor chip apart from the switching element are detected to obtain the temperature difference $\Delta T$.

When the switching element is, for example, the MOSFET, a gate voltage is controlled to increase a drain-source voltage Vds, that is, to increase an on-resistance. As such, the current flowing in the MOSFET is clamped to the threshold sufficiently lower than the rush current. However, when the Vds increases, heat generated in the MOSFET also increases. As a result, the MOSFET is repeatedly turned on and off due to the detection of the overheat and the lighting of the lamp is delayed. Also, since the overheat is detected from the temperature difference $\Delta T$, when the MOSFET is repeatedly turned on and off, the temperature of the MOSFET gradually increases. Accordingly, the MOSFET is not safely protected.

The present disclosure is made in view of the foregoing issues. Hereinafter, embodiments of the present disclosure will be described with reference to the drawings. In the following embodiments, parts functionally and/or structurally corresponding to each other will be designated with the same symbols.

(First Embodiment)

A schematic structure of a load driving device according to the present embodiment will be described with reference to FIG. 1.

A load driving device 10 shown in FIG. 1 is mounted to a vehicle and drives a load 12 with a battery 11 that is a direct current voltage source. The load driving device 10 is applied to the load 12. For example, the load 12 is a lamp such as a headlight, a heater, a motor and the like. Especially, the load driving device 10 is suitably applied to the load 12 having a large rush current such as the lamp. In the present embodiment, an example in which the load 12 is the lamp will be described. The battery 11 corresponds to a voltage source.

The load driving device 10 includes a power terminal T1, an output terminal T2 and an input terminal T3 as external connection terminals. The load driving device 10 includes a MOSFET 20, a current detection portion 30, a comparator 40, a control circuit 50, a reference generation portion 60, a current conversion portion 70 and a threshold set portion 80.

The power terminal T1 is connected to a positive terminal of the battery 11 through a wiring 13 such as a wire harness.

The power terminal T1 receives a battery voltage VB from the battery 11. In FIG. 1, the wiring 13 is illustrated to have an inductance 13L and a resistance 13R.

The output terminal T2 is connected to the load 12 through a wiring 14 such as a wire harness. The output terminal T2 is a terminal for an output from the load driving device 10 to the load 12. In FIG. 1, the wiring 14 is illustrated to have an inductance 14L and a resistance 14R. The load 12 is connected to a negative terminal of the battery 11 (i.e., ground). The output terminal T2 corresponds to a connection terminal.

The input terminal T3 receives a control order to drive the load 12 from an external device. In the present embodiment, the control order of the lamp, which is the load 12, is received.

The MOSFET 20 is disposed between the battery 11 and the load 12. The MOSFET 20 is turned on to supply electric power from the battery 11 to the load 12. The MOSFET 20 is disposed at a high-side of the load 12. The MOSFET 20 corresponds to a switching element. In the present embodiment, an n-channel type MOSFET is employed as the MOSFET 20. The drain of the MOSFET 20 is connected to the power terminal T1 and the source of the MOSFET 20 is connected to the output terminal T2. The switching element is not limited to the n-channel type MOSFET 20. A p-channel type MOSFET, an IGBT and a bipolar transistor may be employed as the switching element.

The current detection portion 30 detects a current flowing in the MOSFET 20. The current detection portion 30 includes a MOSFET 31 and a resistor 32. The current detection portion 30 corresponds to a detector. The MOSFET 31 corresponds to a sense element. The resistor 32 corresponds to a sense resistor. The MOSFET 31 is arranged in the same semiconductor chip as the MOSFET 20 and has the same structure as the MOSFET 20. The square measures of the MOSFET 20 and the MOSFET 31 are set based on the current flowing in the MOSFET 20 and the current detected by the current detection portion 30. For example, the square measure of the MOSFET 31 is several thousandth to several millionth part of the square measure of the MOSFET 20. The drain of the MOSFET 31 is connected to the power terminal T1 and the source of the MOSFET 31 is connected to a first end of the resistor 32. A second end of the resistor 32 is connected to the output terminal T2. That is, the second terminal of the resistor 32 is connected to the source of the MOSFET 20. The gate of the MOSFET 20 and the gate of the MOSFET 31 are connected to an output terminal of the same gate driver 51.

The current flowing in the MOSFET 31 is proportional to the current flowing in the MOSFET 20. The resistor 32 converts the current flowing in the MOSFET 31 to a voltage.

The comparator 40 compares a current detection value detected by the current detection portion 30 with a threshold value for determining the overcurrent (hereinafter, referred to as an overcurrent threshold) and determines whether the overcurrent flows in the MOSFET 20 (i.e., the switching element). The comparator 40 corresponds to the determination portion. The overcurrent corresponds to a short-circuit current that flows when the MOSFET 20 is short-circuited to the battery 11 or the ground without the load 12. Since the present embodiment describes the high-side operation, the overcurrent corresponds to the current that flows when the MOSFET 20 is short-circuited to the ground (i.e., ground short-circuit state) without the load 12.

The non-inversion input terminal of the comparator 40 is connected to a connection point of the MOSFET 31 and the resistor 32. That is, the non-inversion input terminal receives, as the current detection value, a value of the voltage converted from the current flowing in the MOSFET 31 by the resistor 32. The inversion input terminal of the comparator 40 receives, as the overcurrent threshold, an electric potential at a connection point P, which is described later.

The comparator 40 outputs a determination signal indicating whether the overcurrent flows to the control circuit 50. The comparator 40 outputs a high-level signal indicating that the overcurrent flows when the current detection value is equal to or higher than the overcurrent threshold. On the other hand, the comparator 40 outputs a low-level signal indicating that the overcurrent does not flow when the current detection value is lower than the overcurrent threshold.

The control circuit 50 logically processes the control order that is provided from the non-illustrated external device through the input terminal T3 and the determination signal of the comparator 40. Then, the control circuit 50 outputs the driving signal to the gates of the MOSFETs 20 and 31 through the gate driver 51. As described above, the control circuit 50 controls the MOSFET 20 based on the determination result of the comparator 40. The control circuit 50 corresponds to the controller.

When the control circuit 50 receives the high-level signal instructing the lighting of the lamp as the control order, the control circuit 50 controls the MOSFETs 20 and 31 to be turned on. Even when the control order is the high-level signal, the control circuit 50 controls the MOSFETs 20 and 31 to be turned off when the determination signal of the comparator 40 is shifted from the low-level to the high-level. In the case where the control order is kept in the high level, the control circuit 50 controls the MOSFETs 20 and 31 to be turned on again when a predetermined time period elapses after the MOSFETs 20 and 31 are turned off. When the comparator 40 determines that the overcurrent flows, the control circuit 50 turns off the MOSFET 20 to interrupt the current between the battery 11 and the load 12.

The reference generation portion 60 generates a reference voltage V1 proportional to the battery voltage VB. The reference generation portion 60 includes resistors 61 and 62, a bipolar transistor 63 and a constant current source 64. The resistor 61 and the resistor 62 are connected in series with each other between the power terminal T1 and the ground of the load driving device 10. The reference voltage V1 corresponds to the electric potential at the connection point P1 of the resistors 61 and 62. The reference voltage V1 corresponds to a value obtained by resistance-dividing the battery voltage VB. That is, the reference voltage V1 is proportional to the battery voltage VB.

In the present embodiment, a pnp-type transistor is employed as the bipolar transistor 63. The base of the bipolar transistor 63 is connected to the connection point P1, and the emitter of the bipolar transistor 63 is connected to a first end of the constant current source 64. A second end of the constant current source 64 is connected to the power terminal T1. The collector of the bipolar transistor 63 is connected to the ground. Therefore, while the load is driven, the bipolar transistor 63 is turned on all the time. An electric potential at a connection point P2 of the emitter of the bipolar transistor 63 and the constant current source 64 is obtained by adding a forward voltage Vf to the reference voltage V1.

The current conversion portion 70 converts the reference voltage V1 into the current. The current conversion portion 70 includes bipolar transistors 71, 72 and a resistor 73. In the present embodiment, the bipolar transistor 71 is pnp-type and the bipolar transistor 72 is npn-type. The emitter of the bipolar transistor 71 is connected to the power terminal T1. The base and the collector of the bipolar transistor 71 are connected to the collector of the bipolar transistor 72. The base of the bipolar transistor 72 is connected to the connection point P2 and the emitter of the bipolar transistor 72 is connected to the ground through the resistor 73.

When the load is driven, the bipolar transistor 71 is turned on all the time. When the bipolar transistor 71 is turned on, a current flows from the constant current source 64 to the base of the bipolar transistor 72. As a result, when the load is driven, the bipolar transistor 72 is turned on all the time. An electric potential at a connection point P3 of the emitter of the bipolar transistor 72 and the resistor 73 is obtained by subtracting the forward voltage Vf from the electric potential at the connection point P2. In the current conversion portion 70, the current flows so that the electric potential at the connection point P3 is equal to the electric potential at the connection point P1, which is the same as the reference voltage V1.

The threshold set portion 80 sets the overcurrent threshold. The threshold set portion 80 sets the overcurrent threshold to a higher value as the battery voltage VB is higher. In the present embodiment, the threshold set portion 80 sets the overcurrent threshold so that a relationship between the battery voltage VB and the overcurrent threshold is defined by a primary function, i.e., a liner relationship. Specifically, the threshold set portion 80 sets a value proportional to the battery voltage VB as the overcurrent threshold. The threshold set portion 80 sets the overcurrent threshold according to the current converted by the current conversion portion 70. The above relationship defined by a primary function is not limited to a complete primary function and may be an approximate primary function or an approximate linear relationship.

The threshold set portion 80 includes a bipolar transistor 81 and a resistor 82. The bipolar transistor 81 provides a current mirror circuit with the bipolar transistor 71. When the load is driven, the bipolar transistor 81 is turned on all the time. The emitter of the bipolar transistor 81 is connected to the power terminal T1 and the base of the bipolar transistor 81 is connected to the base and the collector of the bipolar transistor 71.

A first end of the resistor 82, which is for setting the overcurrent threshold, is connected to the collector of the bipolar transistor 81 and a second end of the resistor 82 is connected to the output terminal T2. That is, the second end of the resistor 82 is connected to the source of the MOSFET 20. A connection point P4 of the collector of the bipolar transistor 81 and the resistor 82 is connected to the inversion input terminal of the comparator 40.

Figure 2:
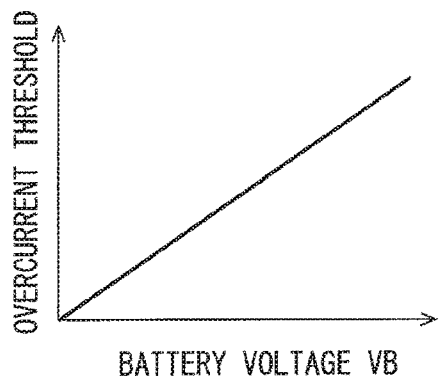
FIG. 2 is a diagram illustrating a relationship between an overcurrent threshold and a battery voltage VB.

In the present embodiment, the bipolar transistors 71 and 81 have the same characteristic. The bipolar transistor 81 receives the same collector current as the bipolar transistor 71. The resistor 82 also receives the current converted from the reference voltage V1, that is, receives the current proportional to the battery voltage VB. As a result, as shown in FIG. 2, the electric potential at the connection point P4, that is, the overcurrent threshold is proportional to the battery voltage VB. Although an example in which the same collector current flows in the bipolar transistors 71 and 81 is described, the present disclosure is not limited to the example. The collector current flowing in the bipolar transistor 71 may be n times of the collector current flowing in the bipolar transistor 81.

As described above, the load driving device 10 has an overcurrent protection circuit that protects the MOSFET 20 and the wirings 13, 14 from the overcurrent. The overcurrent protection circuit includes the current detection portion 30, the comparator 40, the reference generation portion 60, the current conversion portion 70 and the threshold set portion 80.

Figure 3:
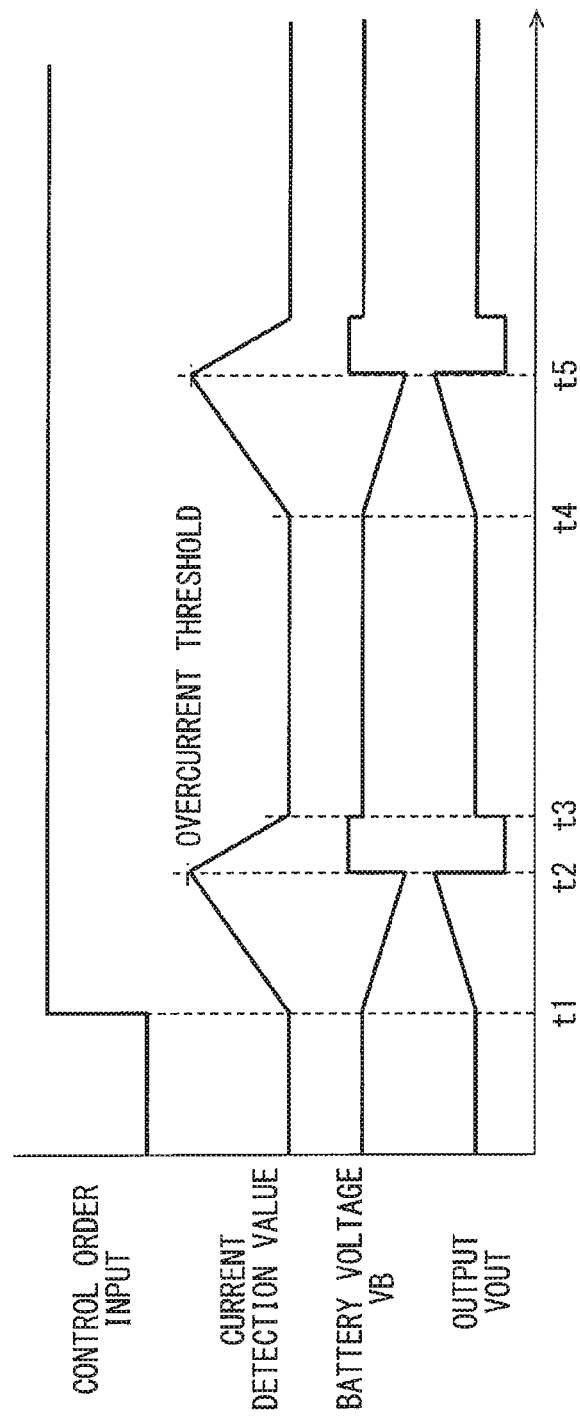
FIG. 3 is a timing chart when a ground short-circuiting occurs.

Next, the processing executed by the control circuit 50 in the ground short-circuit state will be described with reference to FIG. 3. As described above, the ground short-circuit state corresponds to the state in which the MOSFET 20 is connected to the ground (i.e., the negative terminal of the battery 11) without the load 12. In FIG. 1, the ground short-circuit state corresponds to the state in which the wiring 14 is connected to the ground without the load 12.

In the ground short-circuit state, at a time point ti, a control order INPUT, which is inputted to the control circuit 50 through the input terminal T3, is shifted from low-level to high-level instructing the lighting of the lamp. The control circuit 50 outputs the driving signal through the gate driver 51 to turn on the MOSFETs 20 and 31. As a result, the current flowing in the resistor 32, that is, the current detection value increases.

When the sum of the inductances 13L, 14L of the wirings 13, 14 is represented by L, the sum of the resistance 13R, 14R and the resistance of the MOSFET 20 is represented by R, and the short-circuit current flowing in the MOSFET 20 is represented by I, the battery voltage VB is expressed by the following formula 1.

$$VB = I \times R + L \times dI/dt \quad \text{(Formula 1)}$$

When an inductance value of the inductance 13L of the wiring 13 is represented by L1 and a resistance value of the resistance 13R of the wiring 13 is represented by R1, a variation ΔV of the battery voltage VB is expressed by the following formula 2.

$$\Delta V = I \times R1 + dI/dt \times L1 \quad \text{(Formula 2)}$$

The reference of the electric potential is the ground of the load driving device 10. As shown in the above formulas 1 and 2, as the resistance values of the inductance 13L and the resistance 13R of the wiring 13 are higher, the variation ΔV of the battery voltage VB increases, that is, the battery voltage VB decreases largely. On the other hand, as the resistance values of the inductance 14L and the resistance 14R of the wiring 14 are lower, the variation ΔV of the battery voltage VB increases, that is, the battery voltage VB decreases largely. When the MOSFET 20 is turned on, the output voltage VOUT of the output terminal T2 increases.

When the battery voltage VB decreases, the reference voltage V1 also decreases. As a result, while the current detection value increases, the overcurrent threshold decreases due to the decrease of the battery voltage VB. Accordingly, the current detection value reaches the overcurrent threshold at a time point t2. As described above, when the current detection value is equal to or higher than the overcurrent threshold, the comparator 40 outputs the high-level signal indicating the overcurrent. The control circuit 50 turns off the MOSFETs 20 and 31 at the time point t2. When the MOSFET 20 is turned off, the energy stored in the inductances 13L, 14L of the wirings 13, 14 flows into the MOSFET 20, which is turned off, and the battery voltage VB increases. As a result, during the time period until a time point t3, the battery voltage VB is higher than, for example, that of right before the MOSFET 20 is turned on. The current detection value decreases from the time point t2 and reaches 0 at the time point t3.

When the control order INPUT keeps to instructing the lighting of the lamp, the control circuit 50 turns on the MOSFETs 20, 31 again at a time point t4 a predetermined time period after the MOSFETs 20, 31 are turned off. Similarly to the time point t2, when the current detection value reaches the overcurrent threshold at a time point t5, the output of the comparator 40 is shifted from the low-level to the high-level and the control circuit 50 turns off the MOSFETs 20 and 31.

Next, effects of the load driving device 10 according to the present embodiment will be described.

The resistance of the filament of the lamp, which is the load 12, is low at the normal temperature right before the lamp is lit and is high at the high temperature during the lighting of the lamp. Accordingly, the rush current flows right after the lamp is lit. In the rush state in which the rush current flows, the wiring 14 and the load 12 are arranged between the output terminal T2 and the ground. On the other hand, in the ground short-circuit state, the load 12 is not arranged between the output terminal T2 and the ground. Therefore, the resistance between the output terminal T2 and the ground is higher in the rush state than in the ground short-circuit state.

When the connection state of the battery 11 and the load driving device 10, the connection state of the load 12 and the load driving device 10, or the degree of the degradation of the battery 11 are the same in the rush state and the ground short-circuit state, the battery voltage VB is lower in the ground short-circuit state than in the rush state. In the present embodiment, the threshold set portion 80 sets the overcurrent threshold to the higher value as the battery voltage VB is higher.

Figure 4:
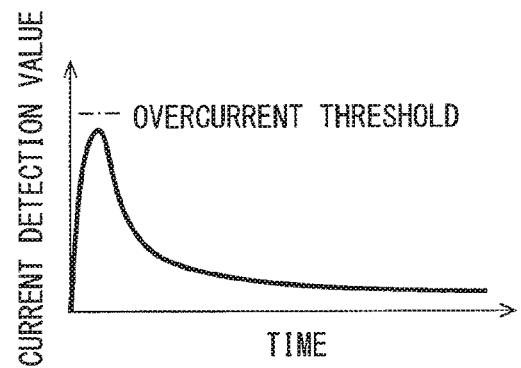
FIG. 4 is a diagram illustrating a relationship between a rush current and the overcurrent threshold.

Therefore, as shown in FIG. 4, the overcurrent threshold is set to the value higher than the rush current in the rush state. For example, in the case in which the battery voltage VB is 18V and 100 A of the rush current flows, the overcurrent threshold is set to the value higher than 100 A when the battery voltage VB is equal to 18V. Since the rush current is lower than the overcurrent threshold set in the rush state, the comparator 40 does not determine the rush current as the overcurrent. Accordingly, erroneous interruption caused by the rush current is restricted and the responsiveness of the load 12 is improved. Specifically, the filament of the lamp is quickly heated and the delay of the lighting of the lamp is restricted.

On the other hand, since the battery voltage VB is lower than in the rush current in the ground short-circuit state, the threshold set portion 80 sets the overcurrent threshold to the value lower than in the rush state. Specifically, the threshold set portion 80 sets the overcurrent threshold to a value equal to or lower than the short-circuit current. Since the short-circuit current is equal to or higher than the overcurrent threshold set in the ground short-circuit state, the comparator 40 determines the short-circuit current as the overcurrent. Since the overcurrent threshold in the ground short-circuit state is low, when the MOSFET 20 is turned off in the ground short-circuit state, the back electromotive force energy generated in the inductances 13L, 14L of the wirings 13, 14 decreases. As a result, the MOSFET 20, the wirings 13 and 14 are safely protected.

Especially in the present embodiment, the threshold set portion 80 sets the overcurrent threshold proportional to the battery voltage VB. Therefore, the overcurrent is accurately detected in the present embodiment. Specifically, the erroneous interruption, which is caused when the overcurrent threshold is lower than the proportional value, and the delaying of interruption, which is caused when the overcurrent threshold is higher than the proportional value, are restricted. That is, increase of the generation of the heat is reduced.

Setting the overcurrent threshold proportional to the battery voltage VB and interrupting the short-circuit current instead of the rush current is similar to monitoring the resistance value between the output terminal T2 and the ground, and interrupting the output from the output terminal T2 when the resistance value is equal to or lower than the predetermined value, i.e., in the ground short-circuit state.

When the battery voltage VB is lower (e.g., 10V) due to the degradation of the battery 11, the rush current also decreases in the proportion of the battery voltage VB. However, in the present embodiment, the overcurrent threshold is proportional to the battery voltage VB, for example, the overcurrent threshold when the battery voltage VB is 10V is lower than the overcurrent threshold when the battery voltage VB is 18V. Accordingly, the rash current is lower than the overcurrent threshold and the comparator 40 does not determine the rush current as the overcurrent.

Figure 5:
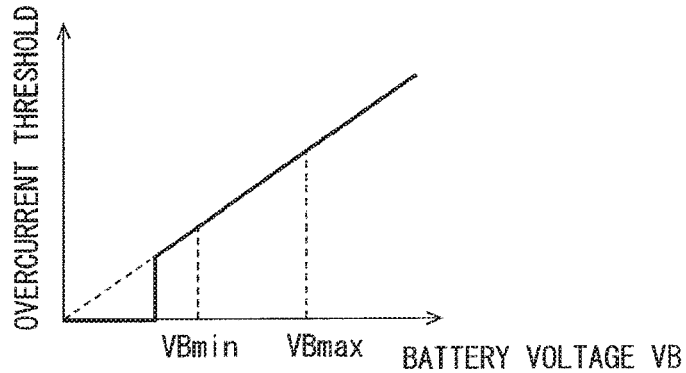
FIG. 5 is a diagram illustrating a relationship between the overcurrent threshold and the battery voltage VB in a first modification.
Figure 6:
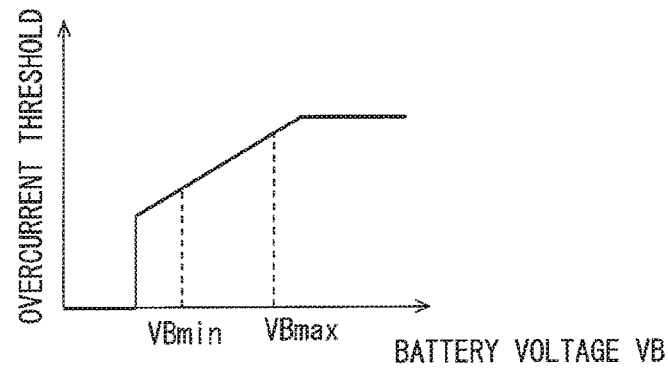
FIG. 6 is a diagram illustrating a relationship between the overcurrent threshold and the battery voltage VB in a second modification.

The proportional relation of the overcurrent threshold and the battery voltage VB is not limited to the example shown in FIG. 2. As shown in a first modification of FIG. 5 and a second modification of FIG. 6, the proportional relation needs to be satisfied at least in a range from VBmin to VBmax of the working voltage of the battery 11. (for example, from 8V to 18V). In a low-voltage region in which the battery voltage VB is equal to or lower than the several voltage (for example 4V), the MOSFET 20 is not stably turned on. In FIG. 5, the overcurrent threshold is set to 0 in the low-voltage region in order to turn off the MOSFET 20, and the proportional relation is satisfied in the other region. In FIG. 6, similarly to FIG. 5, the overcurrent threshold is set to 0 in the low-voltage region, and the overcurrent threshold is set to a constant value in a region in which the battery voltage VB is equal to or higher than a predetermined voltage that is higher than the maximum value VBmax of the working voltage range.

Figure 7:
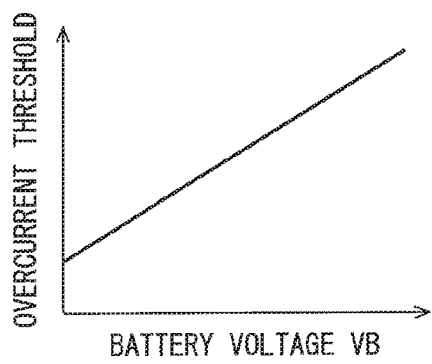
FIG. 7 is a diagram illustrating a relationship between the overcurrent threshold and the battery voltage VB in a third modification.
Figure 8:
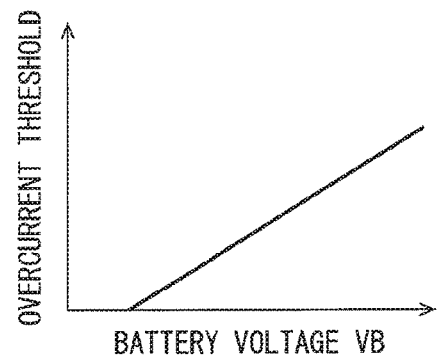
FIG. 8 is a diagram illustrating a relationship between the overcurrent threshold and the battery voltage VB in a fourth modification.

The relationship of the battery voltage VB and the overcurrent threshold is not limited to the proportional relation, that is, a primary function having an intercept of 0. As shown in a third modification of FIG. 7 and a fourth modification of FIG. 8, the overcurrent threshold may be set so that the relationship between the battery voltage VB and the overcurrent threshold is defined by a primary function having an intercept, i.e., a linear relationship having an intercept. Since the overcurrent threshold is set to have the intercept, the effect of noise is reduced. The overcurrent threshold satisfying the relationship of FIG. 7 is set by, for example, adding a resistor between the emitter of the bipolar transistor 63 and the connection point P2 in FIG. 1. The overcurrent threshold satisfying the relationship of FIG. 8 is set by, for example, removing the bipolar transistor 72 of the reference voltage 60 and the current conversion portion 70 and connecting the base and the collector of the bipolar transistor 71 to the resistor 73 in FIG. 1.

Figure 9:
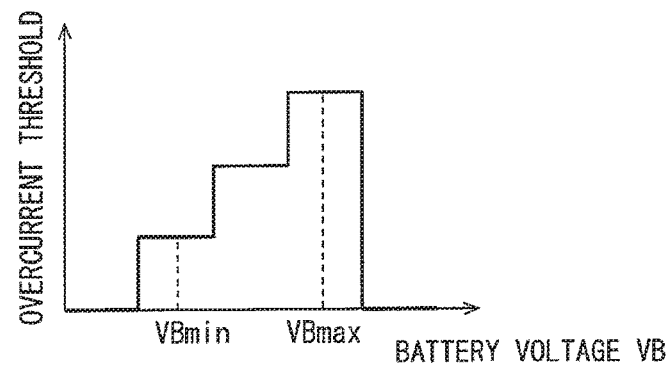
FIG. 9 is a diagram illustrating a relationship between the overcurrent threshold and the battery voltage VB in a fifth modification.

As shown in a fifth modification of FIG. 9, the overcurrent threshold may be increased stepwisely according to the increase of the battery voltage VB. When the number of steps is increased, the relationship of the battery voltage VB and the overcurrent threshold becomes approximate linear relationship. The overcurrent threshold is set to increase stepwisely by, for example, storing a map indicating the relationship of the battery voltage VB and the overcurrent threshold and executing a specific program by the microcomputer. When the load driving device 10 includes plural comparators, the overcurrent threshold is also set to increase stepwisely.

As the current detection portion 30 detecting the current flowing in the MOSFET 20, a shunt resistor arranged between the MOSFET 20 and the output terminal T2 and connected in series with the MOSFET 20 may be employed. In the present embodiment, the current detection portion 30 includes the MOSFET 31 (i.e., the sense element) and the resistor 32 (i.e., the sense resistor). Therefore, in the present embodiment, generation of the heat is restricted compared with the case employing the shunt resistor. Also, the cost is reduced in the present embodiment.

In the present embodiment, the second end of the resistor 32 opposite to the MOSFET 31 is connected to the output terminal T2 leading to the load 12. The current flowing in the MOSFET 20 is detected without employing the operational amplifier. As such, for example, the miniaturization and the cost reduction are achieved in the present embodiment.

Figure 10:
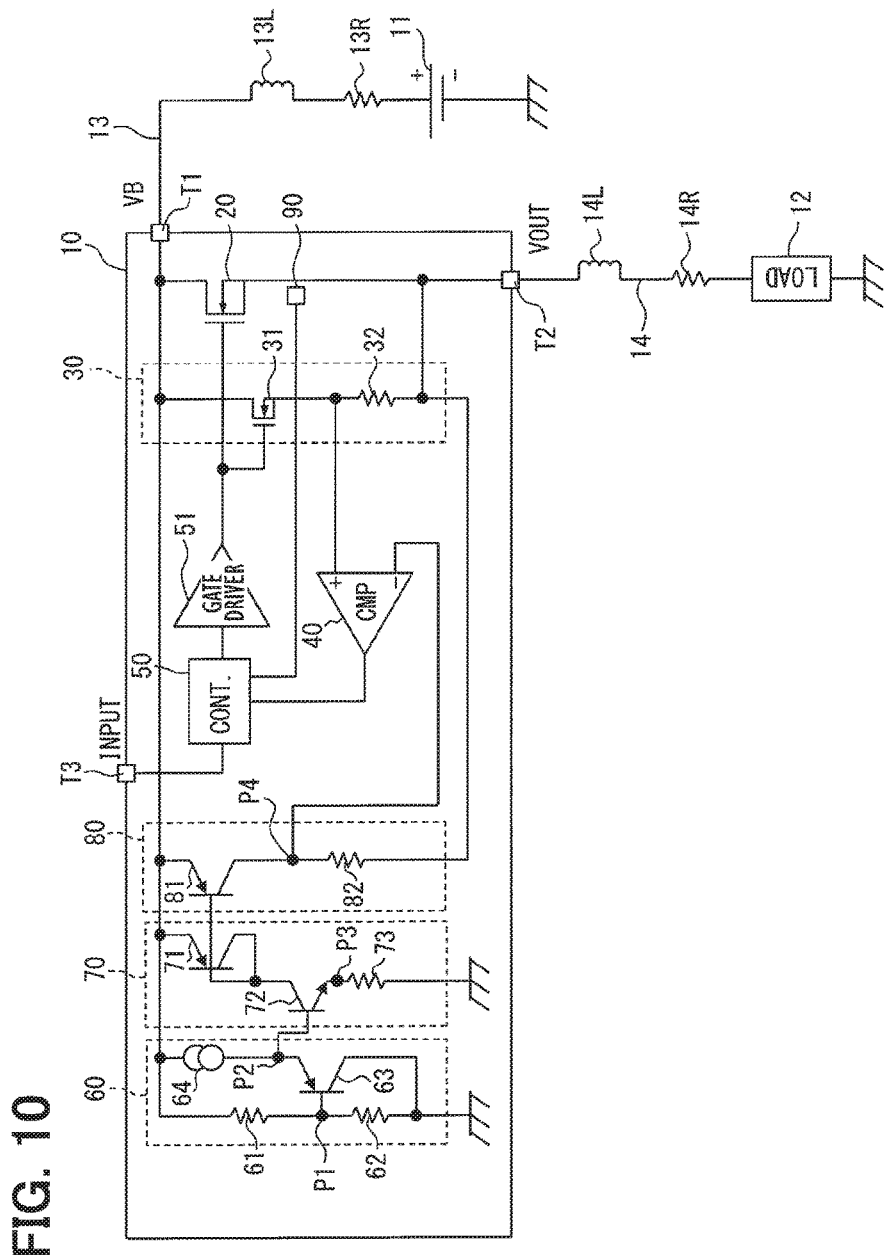
FIG. 10 is a diagram illustrating a schematic structure of a load driving device according to a sixth modification.

As shown in a sixth modification of FIG. 10, the load driving device 10 may include a temperature detection element 90 that detects the temperature of the MOSFET 20 to protects the MOSFET 20 from the overheat. The temperature detection element 90 is provided in the same semiconductor chip as the MOSFET 20. For example, a diode is employed as the temperature detection element 90. The detection signal of the temperature detection element 90 is inputted to the control circuit 50. When the temperature detected by the temperature element 90 increases to reach a predetermined upper limit temperature, the control circuit 50 forcibly turns off the MOSFET 20. When the control order is kept in the high-level and the temperature of the MOSFET 20 decreases to reach a predetermined lower limit temperature after the MOSFET 20 is turned off, the control circuit 50 turns on the MOSFET 20 again.

The rush current increases as the wiring 14 is shorter. For example, in the case where the load 12 has 60 W (i.e., the lamp), when the length of the wiring 14 is about 1 meter, which is the shortest length in the vehicle, the resistance between the output terminal T2 and the ground in the rush state, is about 150 milliohms. This resistance is a value when the length of the wiring 14 is the shortest, that is, when the value of the rush current is the highest. In the vehicle, the length of the wiring 14 (e.g., the wire harness) is, for example, equal to or shorter than 5 meters. Therefore, the resistance between the output terminal T2 and the ground in the ground short-circuit state is equal to or less than around 80 milliohms.

According to the present embodiment, the overcurrent threshold is proportional to the battery voltage VB. Therefore, when the resistance between the output terminal T2 and the ground is equal to or less than 80 milliohms, the elements such as the MOSFET 20 are protected from the overcurrent. That is, the elements such as the MOSFET 20 are protected from the ground short-circuiting equal to or lower than 80 milliohms. When the above temperature detection element 90 is provided, even when the ground short-circuiting higher than 80 milliohms occurs, the elements such as the MOSFET 20 are protected based on the temperature detected by the temperature detection element 90.

(Second Embodiment)

Second embodiment may be described with reference to the above first embodiment. Descriptions of the portions similar to the load driving device 10 of the first embodiment will not be repeated.

Figure 11:
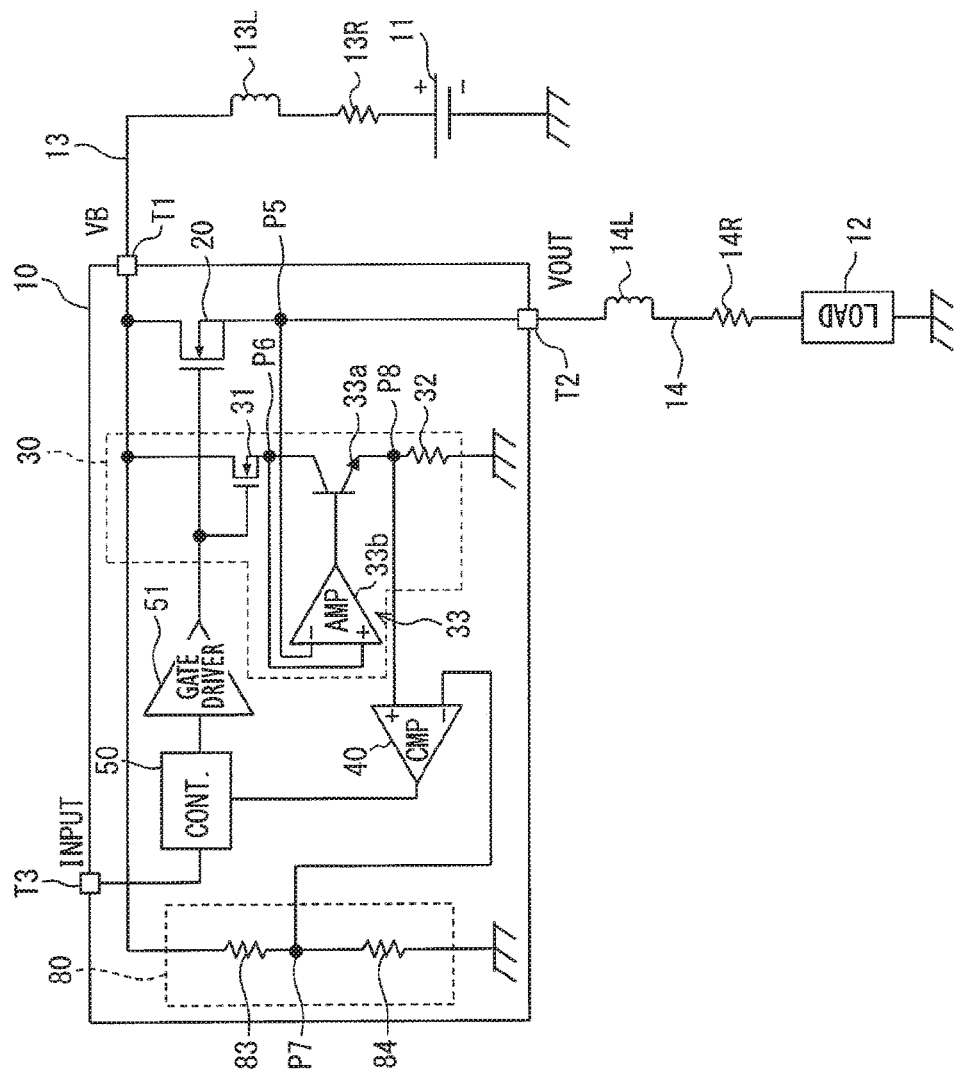
FIG. 11 is a diagram illustrating a schematic structure of a load driving device according to a second embodiment.

As shown in FIG. 11, in the present embodiment, the current detection portion 30 of the load driving device 10 further includes a feedback control portion 33. The feedback control portion 33 controls the current flowing in the MOSFET 31 by feedback control so that the electric potential between the MOSFET 31 and the resistor 32 coincides with the electric potential at the output terminal T2, i.e., the source potential of the MOSFET 20.

The feedback control portion 33 includes a bipolar transistor 33a and the operational amplifier 33b. In the present embodiment, an npn-type transistor is employed as the bipolar transistor 33a. The base of the bipolar transistor 33a is connected to the output terminal of the operational amplifier 33b and the emitter of the bipolar transistor 33a is connected to the resistor 32. The collector of the bipolar transistor 33a is connected to the source of the MOSFET 31.

The inversion input terminal of the operational amplifier 33b is connected to a connection point P5 of the source of the MOSFET 20 and the output terminal T2. The non-inversion input terminal of the operational amplifier 33b is connected to a connection point P6 of the MOSFET 31 and the bipolar transistor 33a. The second end of the resistor 32 opposite to the bipolar transistor 33a is not connected to the output terminal T2 but is connected to the ground of the load driving device 10.

The load driving device 10 of the present embodiment does not include the reference generation portion 60 and the current conversion portion 70. In the present embodiment, the threshold set portion 80 includes the resistors 83 and 84. The resistor 83 and the resistor 84 are connected in series with each other between the power terminal T1 and the ground of the load driving device 10, and the resistor 84 is connected to the ground. The inversion input terminal of the comparator 40 receives the electric potential at the connection point P7 of the resistors 83 and 84 as the overcurrent threshold. The electric potential at the connection point P7 is obtained by resistance-dividing the battery voltage VB and is proportional to the battery voltage VB. Therefore, the threshold set portion 80 is considered to double as the reference generation portion 60. The non-inversion input terminal of the comparator 40 receives the electric potential at the connection point P8 of the bipolar transistor 33a and the resistor 32.

The operational amplifier 33b controls the on-state of the bipolar transistor 33a so that the electric potential at the connection point P6 coincides with the electric potential at the connection point P5. The electric potential at the connection point P5 corresponds to the source potential of the MOSFET 20. For example, when the electric potential at the connection point P6 decreases with respect to the electric potential at the connection point P5, the base current outputted from the operational amplifier 33b decreases and the collector current flowing in the bipolar transistor 33a decreases. When the collector current decreases, the electric potential at the connection point P6 increases. When the electric potential at the connection point P6 exceeds the electric potential at the connection point P5, the base current outputted from the operational amplifier 33b increases and the collector current flowing in the bipolar transistor 33a increases. As a result, the electric potential at the connection point P6 decreases. The feedback control potion 33 controls the electric potential at the connection point P8 so that the electric potential at the connection point P6 coincides with the electric potential at the connection point P5.

According to the load driving device 10 of the present embodiment, since the current detection portion 30 includes the operational amplifier 33b, the current flowing in the MOSFET 20 is detected more accurately.

(Other Embodiments)

The present disclosure may be implemented in a structure in which the switching element (e.g., the MOSFET 20) is arranged between the load 12 and the ground, that is, in a structure in which the switching element is arranged at a low-side of the load 12.

In the above embodiments, the example is described in which the control circuit 50 turns off the MOSFET 20 to interrupt the current when the current detection value reaches the overcurrent threshold. However, the control circuit 50 may clamp (i.e., keep) the current at the overcurrent threshold when the current detection value reaches the overcurrent threshold. In such a case, when the temperature of the MOSFET 20, which is detected by the temperature detection element 90, increases to reach the predetermined interruption temperature, the control circuit 50 turns off the MOSFET 20 and releases the clamped current. When the temperature of the MOSFET 20 decreases to reach the predetermined resurgence temperature, the control circuit 50 turns on the MOSFET 20 again.

The load driving device 10 includes at least the MOSFET 20 (i.e., the switching element), the current detection portion 30 (i.e., the detector), the comparator 40 (i.e., the determination portion), the control circuit 50 (i.e., the controller) and the threshold set portion 80.

As described above, the load driving device 10 has the overcurrent protection circuit protecting the MOSFET 20 and the wirings 13 and 14 from the overcurrent. The overcurrent protection circuit includes at least the current detection portion 30, the comparator 40 and the threshold set portion 80.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A load driving device comprising:
    a switching element that is arranged between a voltage source and a load or between the load and a ground, and is turned on to supply an electric power from the voltage source to the load;
    a detector that detects a current flowing in the switching element;
    a determination portion that compares a detection value detected by the detector with a threshold value, and determines whether an overcurrent flows in the switching element;
    a controller that controls the switching element based on a determination result of the determination portion; and
    a threshold set portion that sets the threshold value to a higher value as a voltage of the voltage source is higher, wherein:
    the detector includes
        a sense element that is arranged in a same semiconductor chip as the switching element, and
        a sense resistor that is connected in series with the sense element; and
    a current flowing in the sense element is proportional to the current flowing in the switching element.

2. The load driving device according to claim 1, wherein
the threshold set potion sets the threshold value so that a relationship between the voltage of the voltage source and the threshold value is defined by a primary function.

3. The load driving device according to claim 2, wherein
the threshold set portion sets the threshold value so that the threshold value is proportional to the voltage of the voltage source.

4. The load driving device according to claim 1, wherein
the determination portion includes a comparator that compares a voltage converted from the current flowing in the sense element by the sense resistor with the threshold value.

5. The load driving device according to claim 1, further comprising:
a connection terminal that is connected to the load, wherein:
the switching element is connected to the connection terminal;
the sense resistor has a first end connected to the sense element; and
the sense resistor has a second end connected to the connection terminal.

6. A load driving device comprising:
a switching element that is arranged between a voltage source and a load or between the load and a ground, and is turned on to supply an electric power from the voltage source to the load;
a detector that detects a current flowing in the switching element;
a determination portion that compares a detection value detected by the detector with a threshold value, and determines whether an overcurrent flows in the switching element;
a controller that controls the switching element based on a determination result of the determination portion;
a threshold set portion that sets the threshold value to a higher value as a voltage of the voltage source is higher;
a reference generator that generates a reference voltage proportional to the voltage of the voltage source based on the voltage of the voltage source; and
a current converter that converts the reference voltage into a current, wherein
the threshold set portion sets the threshold value based on the current converted by the current converter.

7. The load driving device according to claim 1, further comprising:
a connection terminal that is connected to the load, wherein:
the switching element is connected to the connection terminal;
the detector includes a feedback controller; and
the feedback controller controls the current flowing in the sense element by a feedback control so that an electric potential at a portion between the sense element and the sense resistor coincides with an electric potential at the connection terminal.

8. The load driving device according to claim 6, wherein
the threshold set potion sets the threshold value so that a relationship between the voltage of the voltage source and the threshold value is defined by a primary function.

9. The load driving device according to claim 8, wherein
the threshold set portion sets the threshold value so that the threshold value is proportional to the voltage of the voltage source.

10. The load driving device according to claim 6, wherein:
the detector includes
a sense element that is arranged in a same semiconductor chip as the switching element, and
a sense resistor that is connected in series with the sense element; and
a current flowing in the sense element is proportional to the current flowing in the switching element.

11. The load driving device according to claim 10, wherein
the determination portion includes a comparator that compares a voltage converted from the current flowing in the sense element by the sense resistor with the threshold value.

12. The load driving device according to claim 10, further comprising:
a connection terminal that is connected to the load, wherein:
the switching element is connected to the connection terminal;
the sense resistor has a first end connected to the sense element; and
the sense resistor has a second end connected to the connection terminal.

* * * * *